United States Patent [19]
Adams

[11] Patent Number: 5,730,169
[45] Date of Patent: Mar. 24, 1998

[54] TEMPERATURE AND IMPACT SENSITIVE SAFETY VALVE

[76] Inventor: George R. Adams, 1227 Hudson Hills Dr., Ferguson, Mo. 63135

[21] Appl. No.: 692,098

[22] Filed: Aug. 5, 1996

Related U.S. Application Data

[62] Division of Ser. No. 425,994, Apr. 20, 1995, Pat. No. 5,542,445.

[51] Int. Cl.$^6$ ................................... F16K 17/36
[52] U.S. Cl. .................... 137/68.12; 137/68.14; 137/68.15
[58] Field of Search .............. 137/68.12, 68.14, 137/68.15

[56] References Cited

U.S. PATENT DOCUMENTS

| | | |
|---|---|---|
| 32,572 | 6/1861 | Mann, Jr. . |
| 2,048,388 | 7/1936 | Johnsen . |
| 2,804,317 | 8/1957 | Prater . |
| 3,794,057 | 2/1974 | Badger ................... 137/68.15 |
| 4,727,903 | 3/1988 | Sturgis et al. . |
| 4,745,940 | 5/1988 | Ely . |
| 5,111,837 | 5/1992 | Morris et al. . |
| 5,250,041 | 10/1993 | Folden et al. ............ 137/68.14 X |

*Primary Examiner*—John Fox
*Attorney, Agent, or Firm*—Howell & Haferkamp, L.C.

[57] ABSTRACT

A dual function safety valve is designed to automatically stop a flow of fluid through the valve in response to the valve being subjected to a minimum impact force or excessive vibration and in response to the valve being subjected to heat above a predetermined minimum temperature.

17 Claims, 3 Drawing Sheets

TEMPERATURE AND IMPACT SENSITIVE SAFETY VALVE

This application is a divisional patent application of application Ser. No. 08/425,994, filed Apr. 20, 1995 and issued as U.S. Pat. No 5,542,445 on Aug. 6, 1996.

BACKGROUND OF THE INVENTION

(1) Field of the Invention

The present invention pertains to a safety valve designed to automatically interrupt or stop a flow of fluid through the valve in response to the valve being subjected to a predetermined minimum impact force or vibration, and in response to the valve being subjected to heat above a predetermined minimum temperature.

(2) Description of the Related Art

The prior art includes various different types of valves that are designed to interrupt or stop a flow of fluid in response to being subjected to some external condition. An example of such a prior art valve is disclosed in the patent of Prater, U.S. Pat. No 2,804,317, which discloses a valve constructed to automatically interrupt fluid flow through the valve in response to the valve exterior housing being subjected to an excessive impact force or excessive vibration sufficient to fracture the valve housing. Valves of this type are frequently employed on storage tanks containing a pressurized fluid such as propane, butane, or the like. The valve is positioned between the storage tank and a conduit or some other carrier of the flow of fluid from the tank. The valve includes means that are automatically actuated upon the severing of a portion of the valve housing to stop the flow of fluid from the tank. The patents of Newman et al., U.S. Pat. No. 2,586,248; Hicks, U.S. Pat. No. 4,488,566; Sturgis et al., U.S. Pat. No. 4,727,903; Jindra et al., U.S. Pat. No. 4,792,115; U.S. Pat. Friend et al., U.S. Pat. No. 4,887,631; Silagy, U.S. Pat. No. 4,932,431; Sturgis, U.S. Pat. No. 4,974,623; and Silagy, U.S. Pat. No. 5,027,845 all disclose valves constructed to automatically interrupt fluid flow in response to being subjected to a minimum temperature level. Valves of this type are typically employed between storage tanks of combustible fluids and the supply line of the fluid leading from the tank. These valves operate to automatically close when the exteriors of the valves are subjected to a predetermined minimum temperature, thereby preventing the combustible fluid from escaping from the tank uncontrollably should the fuel line leading from the tank be broken due to a fire.

A more specialized safety valve construction performs the function of automatically interrupting fluid flow through the valve when the valve is subjected to an external impact force and/or when the valve is subjected to an external temperature exceeding a predetermined minimum temperature. Examples of dual function valves of this type are disclosed in the patents of Johnsen, U.S. Pat. No. 2,048,388 and Ely, U.S. Pat. No. 4,745,940. Valves of this type are frequently employed on service station gasoline pumps and on gas or fuel lines leading into buildings.

Despite the ability of the specialized dual function safety valves to interrupt fluid flow when subjected to an excessive impact force or vibration or excessive heat, many of the dual function valves have not found widespread application due to their complicated and intricate constructions. Many prior art dual function valves have elaborate constructions that are expensive to manufacture, with some valves having such intricate constructions that they can only be manufactured by hand.

It is therefore an object of the present invention to provide a novel, more simplified construction for a dual function safety valve which automatically interrupts fluid flow through the valve in response to the valve being subjected to a minimum external impact force or vibration and/or in response to the valve being subjected to an external temperature that exceeds a predetermined minimum temperature. The more simplified construction of the valve of the present invention enables it to be more easily, and more economically manufactured. Although the safety valve of the invention has a more simplified and less intricate construction than dual function valves of the prior art, the design of the valve ensures its reliable operation in automatically interrupting fluid flow through the valve when subjected to a minimum impact force or vibration and/or excessive heat.

SUMMARY OF THE INVENTION

The safety valve of the present invention may be used in any environment or application where it is desired to have some means of automatically interrupting or stopping a flow of fluid when the containing housing of the fluid flow is subjected to a minimum impact force or vibration and/or an external temperature exceeding a predetermined minimum temperature. The containing housing of the fluid flow could be a storage tank for the fluid or a conductor of the fluid.

The safety valve of the present invention is basically comprised of a valve housing having a hollow interior and opposite inlet and outlet ends. An inlet coupling is connected to the inlet end of the valve housing. The inlet coupling has an inlet bore extending therethrough communicating with the interior of the housing. An end wall is connected to the outlet end of the valve housing and has an end wall bore extending therethrough. The end wall bore communicates with the interior volume of the valve housing.

An outlet coupling is positioned adjacent the end wall of the valve housing. The outlet coupling has an outlet bore extending therethrough which is concentric to the end wall bore and the inlet coupling bore. The outlet coupling bore communicates with the valve housing interior through the end wall bore.

A tubular member is positioned within the end wall bore and outlet coupling bore. One end of the tubular member is secured in the outlet coupling bore by a fusible solder or adhesive. The opposite end of the bore extends into the interior volume of the valve housing. A valve head or stopper is secured to the end of the tubular member within the valve housing interior. A port opening extends through the side of the tubular member and communicates the interior of the tubular member with the interior of the valve housing. An annular shoulder is formed on the tubular member and abuts against the valve housing end wall. The periphery of the tubular member has a necked down groove or rim formed therein. The rim is positioned adjacent the abutment of the outlet coupling with the valve housing end wall.

A coil spring spirals around the exterior of the tubular member. The coil spring is positioned between the valve head of the tubular member and the end wall of the valve housing. The spring biases the valve head toward the inlet bore of the valve housing. However, the fusible connection of the tubular member to the outlet bore prevents the spring from biasing the valve head against the inlet bore and closing or stopping fluid flow through the valve housing.

In use, a fluid flow passes through the inlet bore into the valve housing interior and around the valve head on the one end of the tubular member. The flow then passes through the port opening in the side of the tubular member and through the interior of the tubular member to the outlet bore. In this manner, a flow of fluid easily passes through the construction of the safety valve of the invention. However, should the valve housing be subjected to heat above a predetermined temperature, the fusible connection of the tubular member to the outlet bore provided by the solder or adhesive releases its hold on the tubular member, permitting the coil spring to bias the valve head toward the inlet bore. When the valve head engages over the inlet bore due to the biasing of the spring, fluid flow through the valve housing is stopped. In this manner, the safety valve of the present invention stops fluid flow through the valve in response to the valve being subjected to a minimum temperature. The minimum temperature at which the valve will automatically stop fluid flow can be predetermined depending on the particular type of solder or adhesive employed to secure the end of the tubular member in the outlet coupling bore.

Furthermore, should the safety valve of the invention be subjected to a minimum impact force or vibration, the frangible portion of the tubular member at the groove or rim will break, causing the outlet coupling to separate from the end wall of the valve housing. The breaking of the tubular member enables the coil spring to bias the valve head toward the inlet bore of the valve housing. The biasing force of the spring causes the valve head to close over the inlet bore, thereby stopping the flow of fluid through the valve housing in response to the fracture of the housing.

BRIEF DESCRIPTION OF THE DRAWINGS

Further objects and features of the present invention are revealed in the following detailed description of the preferred embodiment of the invention and in the drawing figures wherein.

DESCRIPTION OF THE PREFERRED EMBODIMENT

Figure 1:
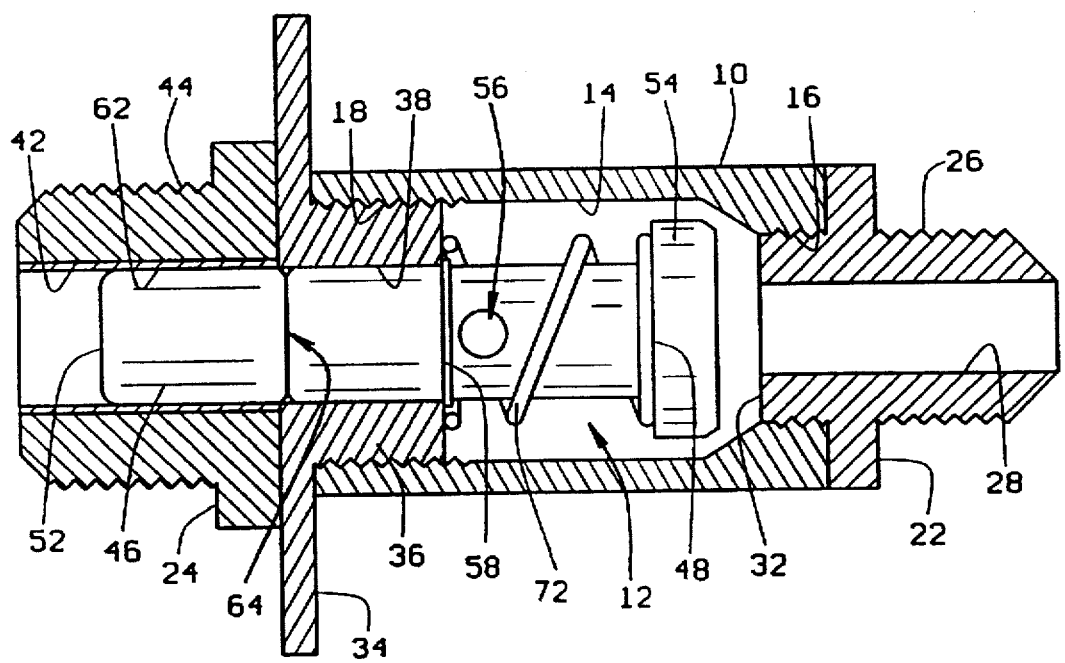
FIG. 1 is an in section view of the safety valve construction of the present invention.

The safety valve of the present invention may be used in a variety of different applications where it is desirable to interrupt a flow of fluid through a conducting conduit or line in response to the line being subjected to a minimum impact force or vibration and/or a predetermined minimum temperature. The valve can be constructed for use in controlling the flow of various types of liquids and gases. The valve of the invention may be used in a gas line to a building to automatically interrupt flow through the line in the event of an earthquake or fire. It may be used in industrial applications such as in pipelines and hoses. It may also be used in a motor vehicle to automatically interrupt a flow of gas or other fuel from the vehicle's fuel tank when the vehicle is involved in an accident or fire. The valve may be provided in new vehicles or could be retrofit to older vehicles. The valve may be used on agricultural equipment. Other examples include use of the valve on storage tanks of compressed, flammable fluids such as propane and butane. The valve may be used in lines where the flow of fluid in the line is under pressure, and when the flow is gravity fed and not under pressure. The valve may be used in applications where the fluid flow is not flammable, but a spill or leak of the fluid is still hazardous. The valve may be constructed in various sizes for different applications. The above examples of how the valve of the invention may be used are only a few of the many applications in which the valve of the invention may be employed and are intended to be illustrative and not limiting. From the description of the valve to follow, it will be readily apparent to the artisan of ordinary skill that the valve of the invention is suitable for may different applications, too numerous to mention. Therefore, the valve is described as automatically stopping a flow of fluid in response to certain external conditions. It is intended that this description cover all possible applications of the valve.

The drawings forming a part of this application are illustrative of several embodiments of the valve and are not drawn to scale or intended to be limiting.

The dual function safety valve of the invention may be constructed from various different types of materials. The valve has a cylindrical housing 10 with an interior volume 12 surrounded by a cylindrical interior surface 14 of the housing. The housing has opposite first 16 and second 18 ends that are both open to the housing interior 12.

A first connector 22 is screw fitted into the first end 16 of the valve housing. As seen in FIG. 1, the first connector 22 has screw threading 26 around its exterior to be used in connecting the valve to a source of fluid flow (not shown). The source of fluid flow could be a conduit or tube or could be a storage tank of the fluid. Additionally, the fluid flow could be fed by gravity or could be under pressure. The screw threading 26 shown on the exterior of the first connector 22 is illustrative only. It should be appreciated by the artisan of ordinary skill that many various different types of connectors may be employed with the valve of the invention to connect the valve to various different types of conductors of fluid flow and various different types of fluid storage containers. The first conductor 22 also has a first bore 28 extending therethrough communicating with the interior volume 12 of the valve housing. The first bore 28 is an inlet bore that conducts fluid flow through the bore to the housing interior. An end face 32 of the first connector 22 positioned in the valve housing interior 12 acts as a valve seat in the functioning of the valve as will be explained.

An end wall 34 is provided at the housing second end 18. The end wall has a projection 36 with screw threading on its exterior. The projection screw threading is received within complementary screw threading formed in the interior of the housing at the housing second end 18. A cylindrical bore 38 extends through the end wall 34 concentric with the housing interior 12 and the bore 28 of the first connector. The end wall 34 is an annular wall that projects radially from the valve housing 10. The projection of the end wall from the valve housing enables the wall to be used as a flange in securing the valve housing to another support member in the environment in which the valve housing is used.

The second connector 24 abuts against the end wall 34 with the end wall being positioned between the second connector 24 and the valve housing 10. The second connector 24 has a second cylindrical bore 42 extending therethrough. The second bore 42 is concentric with the end wall bore 38, the housing interior 12 and the first connector bore 28. As seen in FIG. 1, the second bore 42 communicates with the housing interior 12 through the end wall bore 38. In the preferred embodiment of the invention, the second bore 42 is used as an outlet bore that receives a flow of fluid from the housing interior 12 through the end wall bore 38. The second connector 24 also has screw threading 44 around its periphery. The screw threading 44 may be employed to connect the second connector 24 to a conductor of fluid flow. As with the first connector 22, although screw threading is shown on the exterior of the second connector 24, it should be appreciated by the ordinary skilled artisan that various different types of connectors may be formed on the exterior of the second connector 24 to enable the second connector 24 to be connected to various different types of fluid conductors or fluid containers.

A hollow cylindrical tube 46 extends from a first end 48 of the tube positioned in the housing interior 12, through the end wall bore 38 to a second end 52 of the tube positioned in the second connector interior bore 42. The tube passes in sliding, sealing engagement through the end wall bore 38. A valve head or valve stop 54 is secured to the tube first end 48 closing over the opening at this end of the tube. At least one port opening 56 is formed through the side wall of the tube 46 providing fluid communication from the valve housing interior 12 through the port opening 56 to the interior of the tube. If desired, an additional diametrically opposite port opening could be provided through the tube wall. An annular shoulder 58 is formed around the exterior of the tube 46. The annular shoulder 58 abuts against the projection 36 of the sliding end wall 34 and prevents sliding movement of the tube 46 to the left relative to the end wall 34 as viewed in FIG. 1.

A portion of the tube length adjacent its second end 52 is securely held to the second connector interior bore 42 by a heat sensitive material 62. In the preferred embodiment of the invention, the heat sensitive material employed is a solder, preferably Certanium® 34 C (Certanium® is a registered trademark of Premier Industrial Corporation). This solder has a tensile strength of up to 14,000 p.s.i. and a melting temperature of 431° F. (220° C.). As shown in FIG. 1, the portion of the tube 46 adjacent its second end 52 is secured in the second connector bore 42 so that the valve stop 54 is spaced from the valve seat end face 32 of the first connector 22. Also note that this positioning of the valve stop 52 relative to the valve seat 32 is obtained by inserting the tube member 46 through the end wall bore 38 until the annular shoulder 58 of the tube abuts against the end wall. It will be appreciated by the artisan of ordinary skill that although a particular solder is preferred as the heat-sensitive material securing the tube 46 in the second connector bore 42, other types of heat-sensitive materials may be employed for this purpose. Additionally, employing other types of heat sensitive materials enables adjusting the minimum temperature at which the material holding the tube 46 in the second connector bore 42 will release its hold on the tube.

The connection of the tube 46 to the second connector interior bore 42 by the heat-sensitive material 62 and the abutment of the annular shoulder 58 with the housing end wall 34 employs the tube 46 as the only connection between the second connector and the valve housing 10. When the heat-sensitive material 62 releases its hold on the tube 46, the second connector 24 also becomes disconnected from the valve housing 10.

The tube 46 has a necked down rim 64 formed around its periphery. The necked down rim 64 forms a frangible portion of the tube. The rim 64 is manufactured by cutting a groove around the periphery of the tube 46, thereby decreasing the thickness of the tube wall at the rim 64. Depending on how deep the groove is cut into the exterior surface of the tube, the force required to break the tube at the rim 64 may be varied. As seen in FIG. 1, the rim 64 is positioned along the length of the tube 46 so that it is adjacent the abutment of the end wall 34 with the second connector 24. When the valve is subjected to an impact force or vibration that causes the tube to break at the frangible portion 64, the second connector 24, together with that portion of the tube 46 connected to the second connector bore 42 by the heat-sensitive material 62, will separate from the remainder of the valve housing 10.

A spring, preferably a coil spring 72, spirals around the exterior of the tube 46. The spring 72 is positioned between the valve housing end wall 34 and the valve stop 54 secured at the right hand end of the tube, as shown in FIG. 1. The spring 72 biases the valve stop 54 toward the valve seat end face 32 of the first connector 22. When the heat-sensitive material 62 melts releasing its hold on the tube 46, or when the frangible portion 64 of the tube breaks, the spring 72 will bias the valve stop 54 to the right as shown in FIG. 1 and engage the valve stop against the valve seat end face 32 closing fluid communication through a first connector inlet bore 28 to the valve interior 12. The strength of the spring 72 is determined to be greater than the pressure of fluid flow through the inlet bore 28. The strength of the spring, or the force required to compress the spring, may be varied to best suit the valve for any operative environment. It should be appreciated that, depending on the strength of the spring 72, the heat-sensitive material 62 employed in holding the tube 46 in the second connector 42 must have a tensile strength sufficiently large to resist the biasing force of the spring 72 until the heat-sensitive material is melted.

In assembling the component parts of the invention, the valve tube 46 is first inserted through the coil spring 72 and then through the end wall bore 38 compressing the spring. The valve tube is then inserted in sliding, sealing engagement through the end wall bore 38 until the annular shoulder 58 of the tube abuts against the end wall, as shown in FIG. 1. This holds the spring 72 in compression between the valve stop 54 and the end wall 38. The end of the tube 46 projecting from the end wall bore 38 is then inserted into the interior bore 42 of the second connector 24 and is secured in place by the heat-sensitive material 62. The heat-sensitive material 62 holding the end of the tube 64 in the second connector bore 42 also holds the spring 72 in compression between the end wall 34 and the valve stop 54. Next, the cylindrical housing 10 of the valve, with the first connector 22 assembled thereto, is screw threaded on the projection 36 of the end wall 34. This completes the simplified assembly of the valve of the invention. The valve may now be installed in its operative environment whether in a length of conduit conducting a fluid flow or on a storage tank containing fluid.

In installing the valve in its operative environment, in the preferred embodiment of FIG. 1, the source of fluid flow whether a carrier of the flow or storage tank, is connected to the first connector 22. The downstream carrier of the fluid flow is connected to the second connector 24. With the valve installed in its operative environment, the fluid flow passes through the first connector inlet bore 28 and through the valve housing interior 12 around the periphery of the valve stop 54. The flow continues through the port opening 56 in the tube member 46 and through the interior of the tube member. The flow exits the second end 52 of the tube member and continues through the bore 42 of the second connector.

Should the valve be subjected to a minimum heat, for example, if the valve is used in a gas line providing gas to a house and the house catches fire, or if the valve is used in a motor vehicle gas line and the vehicle catches fire, the hold of the heat-sensitive material 62 on the tube 46 will be released as the heat-sensitive material melts. In the preferred embodiment where Certanium® 34 C is employed as the heat-sensitive material, the minimum melting temperature is 431° F. Using different types of heat-sensitive materials will vary this minimum melting temperature. As the heat-sensitive material melts and it releases its hold on the tube member 46, the spring 72 causes the valve stop 54 to move to the right as viewed in FIG. 1 and engage in sealing contact over the valve seat end face 32 of the first connector 22. This stops fluid flow through the valve and prevents any gas conducted by the valve from accelerating or spreading the fire.

Should the valve be subjected to a minimum impact force or vibration, for example where the valve is employed on a gas line leading to a building and the building is subjected to earthquake tremors, the frangible groove rim 64 will break, thereby releasing the hold of the tube 46 to the second connector 24 provided by the heat-sensitive material 62. When the rim 64 breaks, the spring 72 biases the valve stop 54 to the right as viewed in FIG. 1 and engages the valve stop in sealing engagement over the valve seat end face 32 of the first connector 22. This seals closed the first connector bore 28 and prevents any additional flow of gas through the bore which would create the potential for a gas explosion. By varying the depth of the groove rim 64 cut into the external periphery of the tube 46, the minimum impact force or vibration needed to break the frangible portion 64 of the tube can be varied.

Figure 2:
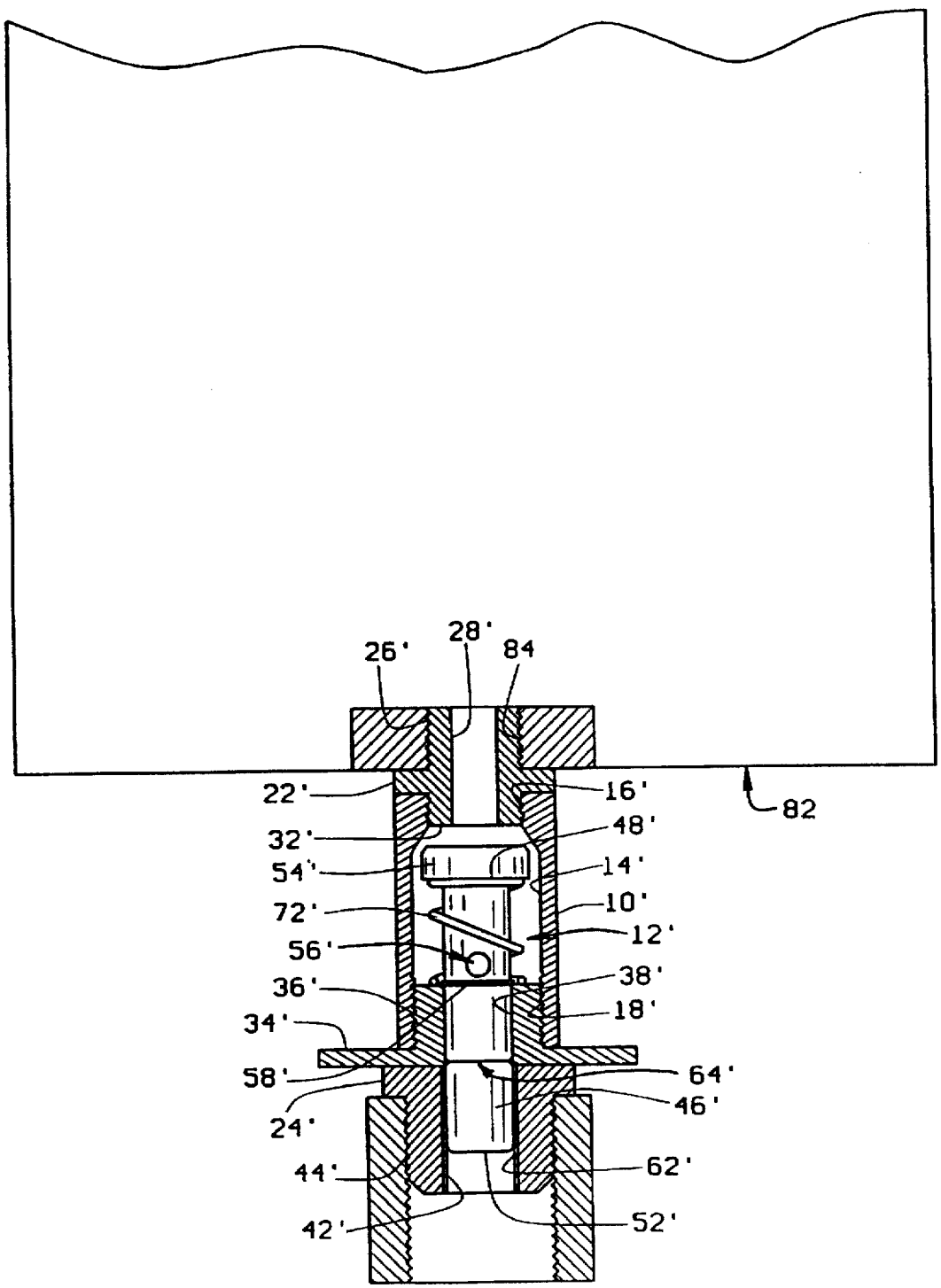
FIG. 2 is an in section view of the valve construction of the present invention employed on a fuel storage tank from which fuel is drawn by a downstream pump.
Figure 3:
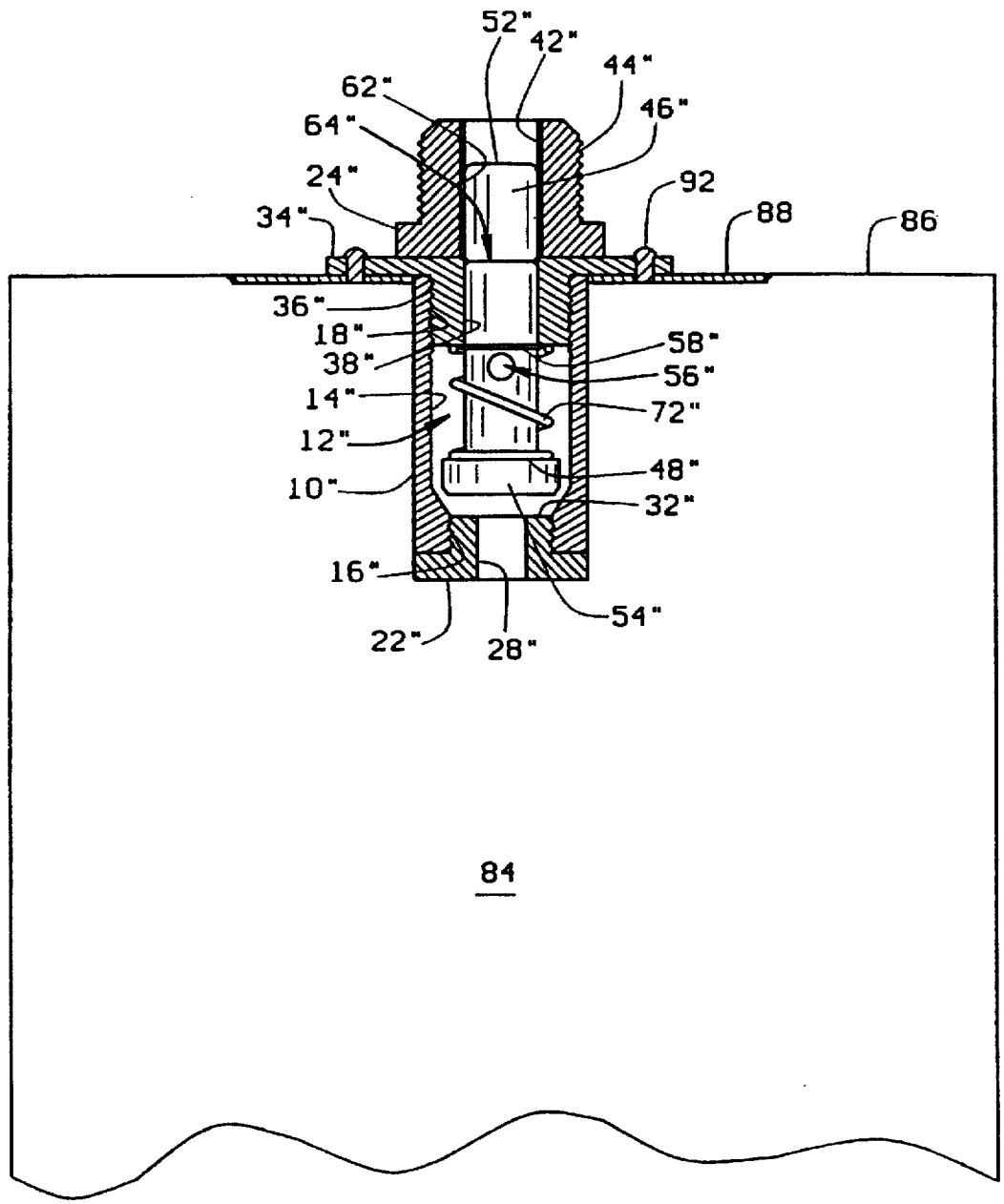
FIG. 3 is an in section view of the valve construction employed on fuel storage tank containing fuel under pressure.

As explained earlier, the dual function safety valve of the invention may be employed in a variety of different applications where it is desired to automatically interrupt and stop fluid flow in response to the valve being subjected to a minimum temperature and/or a minimum impact force or vibration. FIGS. 2 and 3 show examples of different operative environments of the invention. In each of the environments, the component parts of the valve are identical to those described above and include the same reference numbers followed by a prime (') or a double prime ("). In FIG. 2, the reference numbers are followed by the single prime and in FIG. 3 the reference numbers are followed by the double prime.

In FIG. 2, the valve of the present invention is shown connected to a storage tank 82 represented schematically. In the arrangement of the valve on the tank shown in FIG. 2, the fluid flow from the tank can be pressure fed or gravity fed through the inlet bore 28'. FIG. 2 illustrates the ease with which the valve of the invention may be retrofit to an existing tank. In FIG. 2, the first connector 22' is shown as being provided with external screw threading 26' complementary to the existing internal screw threading 84 of the tank port opening. The opposite end of the first connector 22' is screw threaded into the first end 16' of the valve housing 10'. If the tank to which the valve was intended to be retrofit had some other type of connecting means other than the internal screw threaded coupling shown, the first connector 22' could be replaced by another connector having screw threading to connect it to the first end 16' of the housing at one end of the connector, and a mating coupling means complementary to the existing coupling of the tank at its opposite end. Therefore, by replacing the first connector 22' with an appropriate connector, the valve of the invention can be retrofit to existing fluid storage tanks or, in the same manner as described above, existing fluid flow conducting lines or conduits.

FIG. 3 shows an operative environment of the valve of the invention where a substantial portion of the valve housing 10" is installed in the interior volume 84 of a storage tank 86. In this environment, the radially projecting end wall 34" of the valve is employed as a flange coupling the valve to the tank wall 88 by rivets 92. In this operative environment of the invention, only the end wall 34" and the second connector 24" project from the tank wall 88.

In both of the operative environments of the valve shown in FIGS. 2 and 3, the valve operates in the same manner as described above with reference to FIG. 1.

While the present invention has been described by reference to a specific embodiment, it should be understood that modifications and variations of the invention may be constructed without departing from the scope of the invention defined in the following claims.

What is claimed is:

1. A safety valve which automatically stops fluid flow through the valve, the valve comprising:

a valve housing having a hollow interior and having opposite first and second ends, the first end having a first bore extending therethrough communicating with the housing interior and the second end having a second bore extending therethrough communicating with the housing interior.

a frangible tube extending between one of the first and second bores of the respective first and second ends and the housing interior, the tube having a valve stop at one end contained in the housing interior;

means for biasing the valve stop toward one of the first and second bores to close one of the first and second bores and stop a flow of fluid therethrough in response to the frangible tube being broken; and the frangible tube has a hollow interior for conducting a flow of fluid that also passes through the housing interior.

2. The valve of claim 1, wherein:

the frangible tube is the only connection between the one of the first and second ends and the valve housing.

3. The valve of claim 1, wherein:

the frangible tube is secured against sliding movement to one of the first and second bores.

4. The valve of claim 3, wherein:

the means for biasing the valve stop toward the one of the first and second bores to close the one of the first and second bores and stop a flow of fluid therethrough in response to the frangible tube being broken includes a coil spring contained in the valve housing interior and surrounding the frangible tube.

5. The valve of claim 1, wherein:

the first bore is an inlet bore that conducts a flow of fluid into the housing interior and the second bore is an outlet bore that conducts a flow of fluid from the housing interior, and the frangible tube extends between the outlet bore and the housing interior.

6. The valve of claim 5, wherein:

the means for biasing the valve stop toward one of the first and second bores biases the valve stop toward the inlet bore.

7. The valve of claim 6, wherein:

the means for biasing the valve stop toward the inlet bore is a spring contained in the housing interior, the spring having a spring strength larger than a pressure of fluid flow through the housing interior.

8. A safety valve which automatically stops fluid flow through the valve, the valve comprising:

a valve housing having a hollow interior and having opposite first and second ends, the first end having a first bore extending therethrough communicating with the housing interior and the second end having a second bore extending therethrough communicating with the housing interior;

a frangible tube extending between one of the first and second bores of the respective first and second ends and the housing interior, the tube having a valve stop at one end contained in the housing interior;

means for biasing the valve stop toward one of the first and second bores to close one of the first and second bores and stop a flow of fluid therethrough in response to the frangible tube being broke;

the valve housing has an end wall between the housing first an second ends, a bore extends through the housing end wall and communicates with the housing interior, and the frangible tube extends through the end wall bore; and the frangible tube engages in a sliding, sealing engagement with the end wall bore.

9. A safety valve which automatically stops fluid flow through the valve, the valve comprising;

a valve housing having a hollow interior and having opposite first and second ends, the first end having a first bore extending therethrough communicating with the housing interior and the second end having a second bore extending therethrough communicating with the housing interior;

a tube extending between one of the first and second bores of the respective first and second ends and the housing interior, the tube having a valve stop at one end contained in the housing interior and the tube being held in the one of the first and second bores at its opposite end;

means for biasing the valve stop toward one of the first and second bores to close the one of the first and second bores and stop a flow of fluid therethrough in response to the tube being broken between its one end and the opposite end of the tube; and the tube has a hollow interior for conducting a flow of fluid that also passes through the housing interior.

10. The valve of claim 9, wherein:

the tube is the only connection between the one of the first and second ends and the valve housing.

11. The valve of claim 9, wherein:

the first bore is an inlet bore that conducts a flow of fluid into the housing interior and the second bore is an outlet bore that conducts a flow of fluid from the housing interior, and the tube extends between the outlet bore and the housing interior.

12. The valve of claim 11, wherein:

the means for biasing the valve stop toward one of the first and second bores is a spring contained in the housing interior biasing the valve stop toward the inlet bore, the spring having a spring strength larger than a pressure of fluid flow through the housing interior.

13. The valve of claim 9, wherein:

the valve housing has an end wall between the housing first and second ends, a bore extends through the housing end wall and communicates with the housing interior, and the tube extends through the end wall bore.

14. The valve of claim 9, wherein:

the tube has a frangible score line formed around the tube.

15. The valve of claim 9, wherein:

the tube is the only connection between the one of the first and second ends and the valve housing and the one of the first and second ends and the valve housing separate from each other when the tube is broken.

16. A safety valve which automatically stops fluid flow through the valve, the valve comprising;

a valve housing having a hollow interior and having opposite first and second ends, the first end having a first bore extending therethrough communicating with the housing interior and the second end having a second bore extending therethrough communicating with the housing interior;

a tube extending between one of the first and second bores of the respective first and second ends and the housing interior, the tube having a valve stop at one end contained in the housing interior and the tube being held in the one of the first and second bores at its opposite end;

means for biasing the valve stop toward one of the first and second bores to close the one of the first and second bores and stop a flow of fluid therethrough in response to the tube being broken between its one end and the opposite end of the tube; and the tube is the only connection between the one of the first and second ends and the valve housing, and the tube has a hollow interior for conducting a flow of fluid that also passes through the housing interior.

17. A safety valve which automatically stops fluid flow through the valve, the valve comprising;

a valve housing having a hollow interior and having opposite first and second ends, the first end having a first bore extending therethrough communicating with the housing interior and the second end having a second bore extending therethrough communicating with the housing interior;

a tube extending between one of the first and second bores of the respective first and second ends and the housing interiors, the tube having a valve stop at one end contained in the housing interior and the tube being held in the one of the first and second bores at its opposite end;

means for biasing the valve stop toward one of the first and second bores to close the one of the first and second bores and stop a flow of fluid therethrough in response to the tube being broken between its one end and the opposite end of the tube; and the valve housing has an end wall between the housing first and second ends, a bore extends through the housing end wall and communicates with the housing interior, and the tube extends through the end wall bore and engages in a sliding, sealing engagement with the end wall bore.

* * * * *